United States Patent Office 3,530,151
Patented Sept. 22, 1970

3,530,151
HALOGENATION PROCESS
Robert C. Hoare, Hamburg, N.Y., assignor to Allied Chemical Corporation, New York, N.Y., a corporation of New York
No Drawing. Filed May 1, 1964, Ser. No. 364,269
Int. Cl. C09b 1/28, 1/48
U.S. Cl. 260—381          6 Claims

ABSTRACT OF THE DISCLOSURE

An improved method for halogenating water-insoluble organic compounds, such as diarylene-ortho-diketones is set forth whereby fluidity of the reaction mass and reaction yields are improved by conducting said halogenation in the presence of an inert liquid medium comprising an aliphatic alcohol and an organic diluent such as nitrobenzene.

---

The halogenated derivatives of water-insoluble aromatic compounds containing at least three fused rings, such as anthrones, diarylene-ortho-diketones (e.g. anthraquinone and polyanthraquinonyl compounds), indigos, thioindigos, and indanthrenes, are valuable dyestuffs or precursors thereof. It is known to prepare the halogenated forms of these aromatic compounds by suspending the to be halogenated aromatic, at least tricyclic substrate in an inert diluent, such as chlorobenzene or nitrobenzene, and treating the resulting slurry with elemental halogen. This procedure generally requires large, and therefore costly amounts of the diluent, e.g. about 10 or more parts by weight per part of the polycyclic halogenation substrate, to maintain a stirrably fluid reaction mass during the halogenation; and also generally affords only moderate yields of halogenated product. No problems of this type are involved in the case of halogenation substrates which are water soluble, since solution halogenation techniques usually can be conducted with satisfactory results. Good stirrability of the reaction mass is important to accomplish optimum reaction rates, to avoid localized reactions with attendant overheating, etc.

It is the object of the present invention to provide an improved process of halogenating aromatic compounds containing at least three fused rings.

This and other objects and advantages will be apparent from the following description of my invention.

In accordance with the invention I have discovered that the disadvantages of the aforementioned prior art process are overcome and improved yields of the halogenated aromatic compounds containing at least three fused rings are obtained by halogenating the aromatic substrate with an elemental halogen having an atomic weight between 35 and 80 in the presence of a medium essentially consisting of an inert organic diluent and of a monohydric aliphatic alcohol. The inert organic diluent is preferably an aromatic halogen compound of the benzene series or an aromatic nitro-compound of the benzene series; and the amount of the alcohol in said medium is preferably from about 10 to 85% by weight, and the amount of the medium used is sufficient to provide a fluid, stirrable reaction slurry.

It is a surprising feature of the invention that the alcohol and inert organic diluent containing medium exhibits a synergistic character and provides a readily stirrable reaction slurry and an excellent yield of product, in view of the fact that when alcohol is used alone as the diluent medium, all other conditions being equal, the halogenation mass is too viscous for stirring, and little or no halogenated product is obtained. The present improved process gives a more fluid, stirrable reaction mass than alcohol or organic diluent alone, and also about a 5-25% higher yield of halogenated product can be obtained than by prior art procedures employing a nitro- or chloro-benzene as the sole reaction diluent.

The improved process of the present invention is applicable to halogenation, especially chlorination and bromination of a broad range of aromatic compounds insoluble in water, and containing at least three fused rings. Preferably, however, the novel process is used to prepare the aromatic halogen derivatives of diarylene-ortho-diketones including anthraquinone and polyanthraquinonyl compounds; anthrones including benzanthrones, dibenzanthrones, isodibenzanthrones, pyranthrones, and anthanthrones; indanthrenes; indigos; and thioindigos as illustrated by following typical reactions:

DIARYLENE-ORTHO-DIKETONES 1-aminoanthraquinone→a mixture of 1-amino-4-bromo-anthraquinone and 1-amino-2,4-dibromoanthraquinone
2-aminoanthraquinone→2-amino-1,3-dibromoanthraquinone
1-methylaminoanthraquinone→1-methylamino-4-bromoanthraquinone
1-(p-toluidino)anthraquinone→1-(2′-bromo-4′-methylanilino)-4-bromoanthraquinone
1,8-dihydroxyanthraquinone→4-bromo-1,8-dihydroxyanthraquinone
1,8-dihydroxyanthraquinone→4,5-dibromo-1,8-dihydroxyanthraquinone
1,5-dihydroxyanthraquinone→4,8-dichloro-1,5-dihydroxyanthraquinone
1-amino-4-hydroxyanthraquinone→2-chloro-1-amino-4-hydroxyanthraquinone
1,4-diaminoanthraquinone→2-bromo-1,4-diaminoanthraquinone
Leuco-1,4-diaminoanthraquinone→2,3-dibromo-1,4-diamino-anthraquinone
Leuco-1,4-diaminoanthraquinone→2,3-dichloro-1,4-diamino-anthraquinone
1,1′-dianthrimide→4,4′-dibromo-1,1′-dianthrimide
1,1′-dianthraquinonyl→dibromo-1,1′-dianthraquinonyl

ANTHRONES

Benzanthrone→3-bromobenzanthrone
Benzanthrone→3,9-dibromobenzanthrone
Violanthrone (dibenzanthrone)→dichloroviolanthrone (CI 59810)
Isoviolanthrone (isodibenzanthrone)→6,15-dibromoisoviolanthrone
Isoviolanthrone (isodibenzanthrone)→6,15-dibromoisoviolanthrone
Pyranthrone→tribromopyranthrone (CI 59710)
Anthanthrone→4,10-dibromoanthanthrone (CI 59300)

INDANTHRENES

Indanthrone→7,16-dibromoindanthrone

INDIGOS

Indigo→mixture of di- and tribromoindigo

THIOINDIGOS

Thioindigo→mixture of di- and tri-bromothioindigo

The method of the invention is especially suitable for the preparation of aromatic halogen derivatives of aminoanthraquinones including aminoanthraquinones containing N-substituents such as lower alkyl-, aralkyl cycloalkyl- and aryl radicals.

The monohydric aliphatic alcohol preferred for use according to my invention contains between 1 and 6 carbon atoms; for example methyl, ethyl, n-propyl, n-butyl, t-butyl, and isopropyl alcohols belong in this group. Most conveniently the readily available methyl alcohol is employed as the alcoholic component of the diluent.

Typical aromatic halogen- and nitro-compounds of the benzene series which can be used in the diluent mixture according to present process include, for example, chlorobenzene, o-dichlorobenzene, p-chlorotoluene, nitrobenzene, m-nitrotoluene, bromobenzene, and trichlorobenzene.

Preferably the aromatic component of the diluent is o-dichlorobenzene containing a small amount of p-isomer readily available commercially as "Solvent 74," or nitrobenzene. Use of nitrobenzene with the alcohol component gives an especially good result.

Generally at least about 3 and preferably at least about 4.5 to 6 parts of the diluent mixture per part by weight of polycyclic substrate are employed in the present procedure to give a fluid, readily stirrable reaction slurry and an improved yield of aromatic halide product. In general use of more than about 8 parts of diluent per part by weight of substrate provides no additional advantage. The mixture of alcohol and aromatic halogen and/or nitro compound employed as the halogenation diluent in the present process should contain about 10 to 85% by weight of the alcohol. Within this composition range the concentration range of alcohol optimum for highest yield of product and highest fluidity of the reacting mass will somewhat vary, depending on the type of aromatic compound being halogenated. For example, in the halogenation of anthraquinone compounds, particularly aminoanthraquinones, especially good results can be obtained by using a diluent containing about 25 to 80% by weight al- In Examples 1–9 the slurry was charged with bromine for a period of 2 hours and maintained between 35° C. and 50° C. Subsequently the slurry of Examples 1–9 was agitated for 1 hour and then kept at 55° C. ±5° C. for 8 hours.

In Example 10 the slurry was charged with bromine for 1.5 hours at ambient temperature. Subsequently the mixture was agitated for two hours and then heated to 55° C. and kept at that temperature for 16 hours. After the addition of 78 parts of further bromide, of a total of 359 parts, the reaction mass was agitated for 16 hours at 50–55° C. and then heated at 100–110° C. for 5 hours.

In Examples 1–10 the reaction mass was subsequently cooled and filtered, washed with methanol and water, and then dried.

In Table I further details of the examples are given. In each instance the reaction mixture was fluid and stirrable.

EXAMPLE 11

78 parts bromine was charged gradually to a strongly stirred slurry of 106 parts 1-methylaminoanthraquinone in 475 parts methyl alcohol, maintained at about 30–50° C. After about 30% of the bromine was added, the bromination mass became so viscous that it could not be stirred. 120 parts nitrobenzene was added, thereby creating a diluent medium containing 80% alcohol, whereupon the fluidity of the mass increased to the extent that stirring could resume. Bromination was concluded in ac-

TABLE I

| Example No. | Halogenation substrate | Bromine charged, parts | Total diluent, parts | Percent alcohol | End Product | Percent of theoretical yield |
|---|---|---|---|---|---|---|
| 1 | 88 parts 1-amino-2-methylanthraquinone | 78 | 639 | 32.8 | 107 parts 1-amino-2-methyl-4-bromoanthraquinone. | 92 |
| 2 | do | 78 | 491 | 40.3 | do | 91.5 |
| 3 | 106 parts 1-methylaminoanthraquinone | 78 | 479 | 49.6 | 127 parts 1-methylamino-4-bromoanthraquinone | 89 |
| 4 | do | 78 | 517 | 76.8 | 137 parts 1-methylamino-4-bromoanthraquinone | 94.5 |
| 5 | do | 78 | 576 | 68.8 | 130 parts 1-methylamino-4-bromoanthraquinone | 91 |
| 6 | do | 78 | 585 | 69.2 | 110 parts 1-methylamino-4-bromoanthraquinone | 77 |
| 7 | 94 parts 1-(p-toluidino) anthraquinone | 106 | 639 | 32.8 | 105 parts 1-(2-bromo-4-methylanilino)-4-bromoanthraquinone. | 90 |
| 8 | 112 parts 1-methylamino-2-methyl-anthraquinone. | 78 | 516 | 76.7 | 132 parts 1-bromo-2-methyl-4-methylaminoanthraquinone. | 90 |
| 9 | 1,000 parts 1-aminoanthraquinone | 158 | 503 | 43.7 | 117 parts Bromo-1-aminoanthraquinone, containing 34% bromine. | |
| 10 | 100 parts indigo | 359 | 560 | 14.1 | 146 parts Brominated indigo, containing 43% bromine. | | cohol; in the halogenation of indigo compounds best result can be obtained with a diluent containing about 10 to 50% weight alcohol.

The reaction temperature, duration of the reaction, the mode of addition of halogen, and the method of product separation used in the present process are generally those conventionally employed in halogenating polycyclic aromatic compounds with elemental halogen in an inert organic diluent. Also, the present improved process requires only conventional equipment.

The present invention has several advantages over prior art procedures, as will be readily apparent to those skilled in the art. It produces improved yields of the aromatic halogen derivatives of water insoluble aromatic compounds containing at least three fused rings. The novel process of the invention furthermore provides a more fluid, more stirrable reaction mass generally with use of smaller quantities of diluent medium; therefore also the fluid reaction mass can be more readily filtered and the filter cake can be more expeditiously washed free of reaction diluent medium.

The following examples set forth the best methods contemplated in carrying out the invention; but are not to be interpreted as limiting the invention to all details of the examples. Parts and percentages are by weight.

EXAMPLES 1–10

In carrying out each example the substrates to be brominated were slurried in the alcohol-nitrobenzene medium. Methyl alcohol was used in all cases except in Examples 6 and 9 where n-butylalcohol was used instead.

cordance with the process of Examples 2–9, and 135 parts 1-methylamino-4-bromoanthraquinone was recovered, corresponding to 94.5% of theory.

EXAMPLE 12

The process of Example 3 was repeated using molecular equivalent amounts of chlorine instead of bromine. 1-methylamino-4-chloroanthraquinone was obtained in a yield comparable to that of Example 3.

CONTROL A 318 parts 1-methyl-aminoanthraquinone was slurried in 1860 parts nitrobenzene and charged with 270 parts bromine in a manner similar to that employed in the case of Examples 1–9. The bromination mixture was viscous and difficult to stir. 300 parts 1-methylamino-4-bromoanthraquinone was recovered, which corresponds to 70.5% of theory.

I claim:

1. In the process of halogenating water insoluble organic compounds having at least three fused rings selected from the group consisting of diarylene-ortho-diketones and anthrones, with elemental halogen having an atomic weight between 35 and 80, the improvement which comprises conducting said halogenation in the presence of an inert liquid medium essentially consisting of an organic diluent selected from the group consisting of halo- and nitro-substituted mononuclear aromatic hydrocarbons and from 10 to 85 percent by weight of an alkanol.

2. The process of claim 1 wherein said alkanol is methyl alcohol and said organic diluent is nitrobenzene.

3. The process of claim 1 wherein said water-insoluble compound is a diarylene-ortho-diketone.

4. The process of claim 3 wherein said diarylene-ortho-diketone is 1-methylamino-anthraquinone.

5. The process of claim 3 wherein said diarylene-ortho-diketone is 1-(p-toluidino)anthraquinone.

6. In the process of halogenating a water insoluble aromatic compound containing at least three fused rings and being selected from the group consisting of diarylene-ortho-diketones and anthrones with elemental halogen having an atomic weight between 35 and 80, the improvement which comprises conducting said halogenation in the presence of from about 3 to 8 parts per part of water-insoluble aromatic compound of an inert liquid mixture of a lower alkanol and a member of the group consisting of chloro- and nitro-benzenes, said alcohol comprising from about 10 to 85 percent by weight of said liquid mixture.

References Cited

UNITED STATES PATENTS

| | | | |
|---|---|---|---|
| 1,003,268 | 9/1911 | Just et al. | 260—356 |
| 1,562,468 | 11/1925 | Neresheimer | 260—356 |
| 1,658,003 | 1/1928 | Maye et al. | 260—356 |
| 1,646,235 | 10/1927 | Crowell | 260—356 |
| 1,697,137 | 6/1929 | Pongrantz et al. | 260—356 XR |
| 1,925,410 | 9/1933 | Siebenbuerger | 260—356 |
| 2,677,693 | 5/1954 | Nawiasky et al. | 260—356 |
| 2,995,552 | 8/1961 | Genta | 260—356 XR |

LORRAINE A. WEINBERGER, Primary Examiner

R. GERSTL, Assistant Examiner

U.S. Cl. X.R.

260—265, 324, 326.12, 356, 359, 360, 367, 380, 383, 384